(12) United States Patent
Pantzar

(10) Patent No.: US 7,585,137 B2
(45) Date of Patent: Sep. 8, 2009

(54) CUTTING TOOL AND INSERT WITH SERRATED CONTACT SURFACES BETWEEN HOLDER AND INSERT

(75) Inventor: Göran Pantzar, Årsunda (SE)

(73) Assignee: Sandvik Intellectual Property AB, Sandviken (SE)

( * ) Notice: Subject to any disclaimer, the term of this patent is extended or adjusted under 35 U.S.C. 154(b) by 24 days.

(21) Appl. No.: 10/589,258

(22) PCT Filed: Feb. 22, 2005

(86) PCT No.: PCT/SE2005/000244

§ 371 (c)(1),
(2), (4) Date: May 16, 2007

(87) PCT Pub. No.: WO2005/080036

PCT Pub. Date: Sep. 1, 2005

(65) Prior Publication Data

US 2007/0274792 A1 Nov. 29, 2007

(30) Foreign Application Priority Data

Feb. 24, 2004 (SE) .................................. 0400420

(51) Int. Cl.
*B23B 27/16* (2006.01)
*B23B 51/00* (2006.01)
(52) U.S. Cl. ........................... 407/66; 407/33; 407/113
(58) Field of Classification Search ................... 407/40, 407/113, 101–103, 66, 33
See application file for complete search history.

(56) References Cited

U.S. PATENT DOCUMENTS

| 5,555,784 | A | * | 9/1996 | Muendlein et al. ............ 82/158 |
| 5,810,518 | A | * | 9/1998 | Wiman et al. ................ 407/102 |
| 5,820,310 | A | * | 10/1998 | Boianjiu ....................... 407/66 |
| 5,931,613 | A | * | 8/1999 | Larsson ....................... 407/103 |
| 6,102,630 | A | | 8/2000 | Flolo ........................... 407/42 |
| 6,146,060 | A | | 11/2000 | Rydberg et al. ............... 407/40 |

FOREIGN PATENT DOCUMENTS

| EP | 1 260 295 | 11/2002 |
| WO | WO 99/00208 | 1/1999 |
| WO | 02/055245 | 7/2002 |
| WO | 2004/002662 | 1/2004 |

* cited by examiner

*Primary Examiner*—Willmon Fridie
(74) *Attorney, Agent, or Firm*—Drinker Biddle & Reath LLP

(57) ABSTRACT

The invention relates to a cutting tool of the type that comprises, on one hand, a basic body (1) having an insert seat, and on the other hand a cutting insert (2), which is detachably connected in the insert seat and rigidly secured in the same by means of connecting surfaces (3, 5) of serration type, one (3) of which forms said insert seat and comprises first and second ridges (18, 19), which extends perpendicularly to each other. According to the invention, at least the connecting surface that forms the insert seat (3) is formed with, on one hand, two spaced-apart surface fields or sets of a plurality of mutually parallel, first ridges (18A, 18B), which are arranged in extension of each other, and on the other hand one or more second, transverse ridges (19), which are located between the two sets of first ridges (18A, 18B). Furthermore, the invention also relates to a basic body of a cutting tool, as well as a cutting insert as such.

24 Claims, 4 Drawing Sheets

Figure 1:
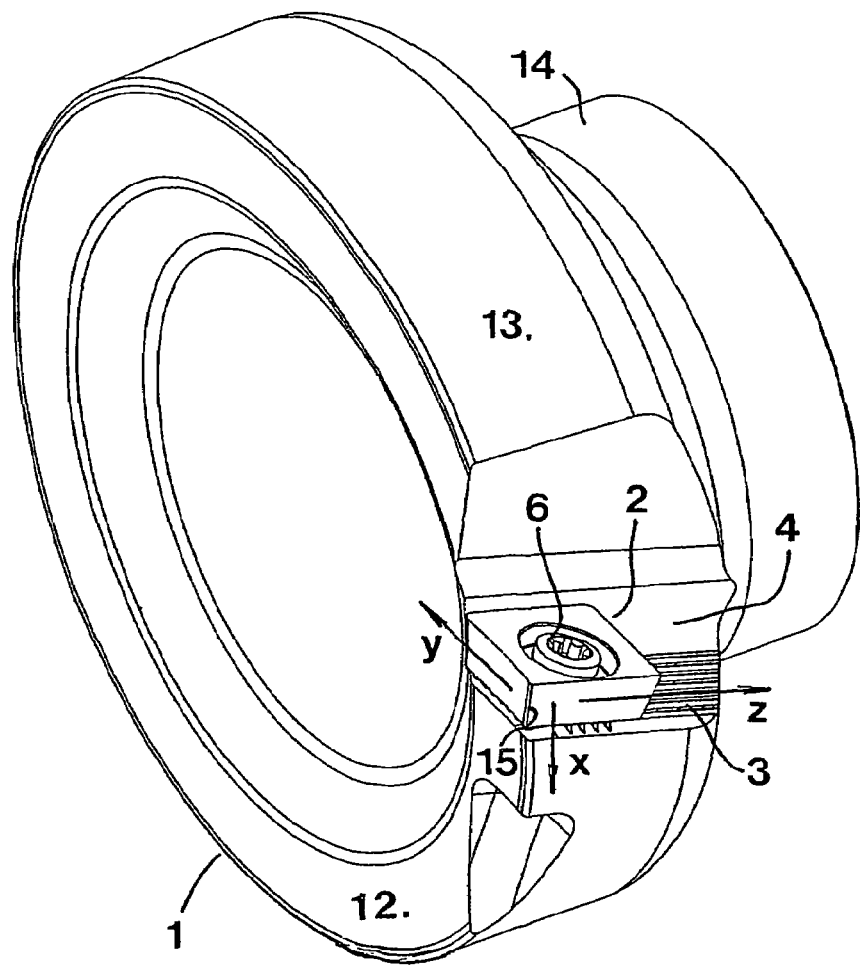

CUTTING TOOL AND INSERT WITH SERRATED CONTACT SURFACES BETWEEN HOLDER AND INSERT

TECHNICAL FIELD OF THE INVENTION

In a first aspect, this invention relates to a cutting tool intended for chip-removing machining of the type that comprises, on one hand, a basic body having an insert seat, and on the other hand a cutting insert, which is detachably connected in the insert seat and rigidly secured in the same by means of connecting surfaces of serration type, one of which forms said insert seat and comprises first and second ridges, which extend perpendicularly to each other.

In practice, the basic body may consist of, for instance, a drill shank or a cutter head, and the cutting insert of an indexable cutting insert.

PRIOR ART

A cutting tool of the above-mentioned type is previously known by WO 9900208 A1. In this case, the serration connecting surface serving as insert seat comprises two sets of ridges, which each are located in a separate surface field. This disposition of the ridges in only two sets or surface fields leads to the disadvantage that the cutting forces, which act on the cutting insert, are not distributed in a desirable, even way along the entire area of the connecting surface; something which means that the ability of the connecting surface to carry and resist large forces becomes limited. In, for instance, four-edged cutting inserts of the type that are indexable in four positions, the corner of the cutting insert that is indexed forward to an active position, accordingly, gets a tendency to be displaced; something which among other things may lead to mediocre machining precision as a consequence of the cutting insert being dislodged from the desired position thereof.

OBJECTS AND FEATURES OF THE INVENTION

The present invention aims at obviating the above-mentioned disadvantages of the previously known cutting tool and at providing an improved cutting tool. Therefore, a primary object of the invention is to provide a cutting tool, the serration connection of which between the basic body and a cutting insert guarantees an even and reliable distribution of the cutting forces acting on the cutting insert along the entire surface extension of the connection. It is also an object to provide a cutting tool, the serration connection of which—for a given tool dimension—can carry larger forces than the previously known serration connection, without being dislodged from the fixed, exact position thereof.

According to the invention, these objects are attained by means of a connecting surface forming the insert seat including, on one hand, two spaced-apart surface fields or sets of a plurality of mutually parallel, first ridges, which are arranged in extension of each other, and on the other hand one or more second, transverse ridges, which are located between the two sets of first ridges.

In a second aspect, the invention also relates to a basic body as such intended for cutting tools. The features of the basic body according to the invention are that the connecting surface of the basic body of the cutting tool includes, on one hand, two spaced-apart sets of a plurality of mutually parallel, first ridges, which are arranged in extension of each other, and on the other hand one or more second, transverse ridges, which are located between the two sets of first ridges.

In a third aspect, the invention also relates to a cutting insert as such intended for cutting tools. The features of this cutting insert are that the connecting surface of the cutting insert of a cutting tool includes, on one hand, two spaced-apart sets of a plurality of mutually parallel, first ridges, which are arranged in extension of each other, and on the other hand one or more second, transverse ridges or tops, which are located between the two sets of first ridges.

BRIEF DESCRIPTION OF THE APPENDED DRAWINGS

Figure 2:
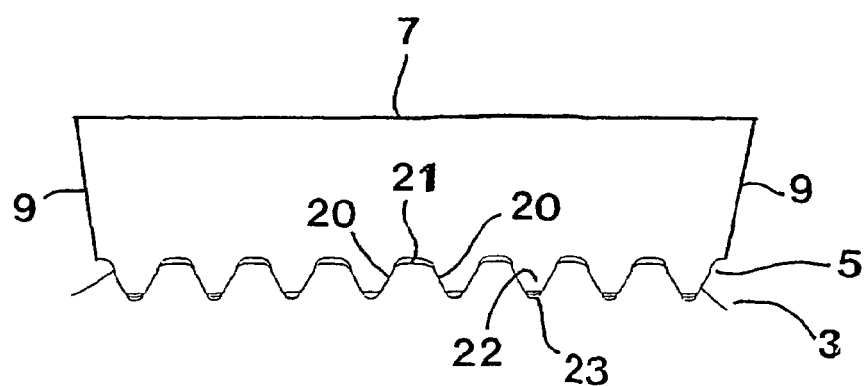
Figure 3:
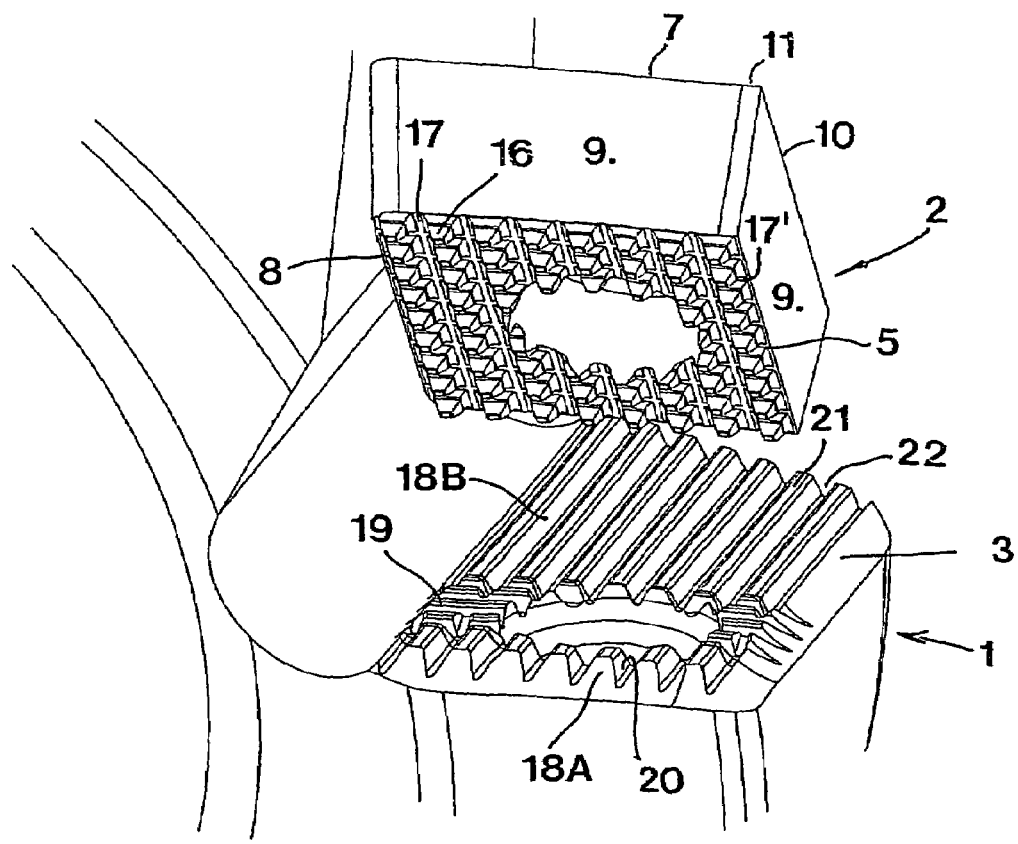
Figure 4:
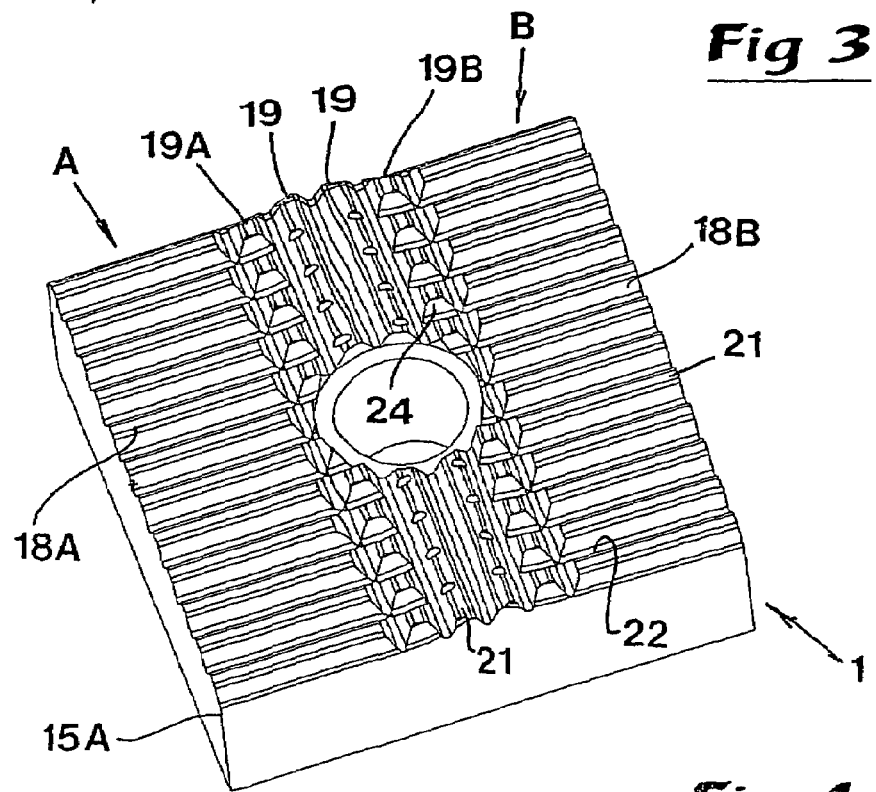
Figure 5:
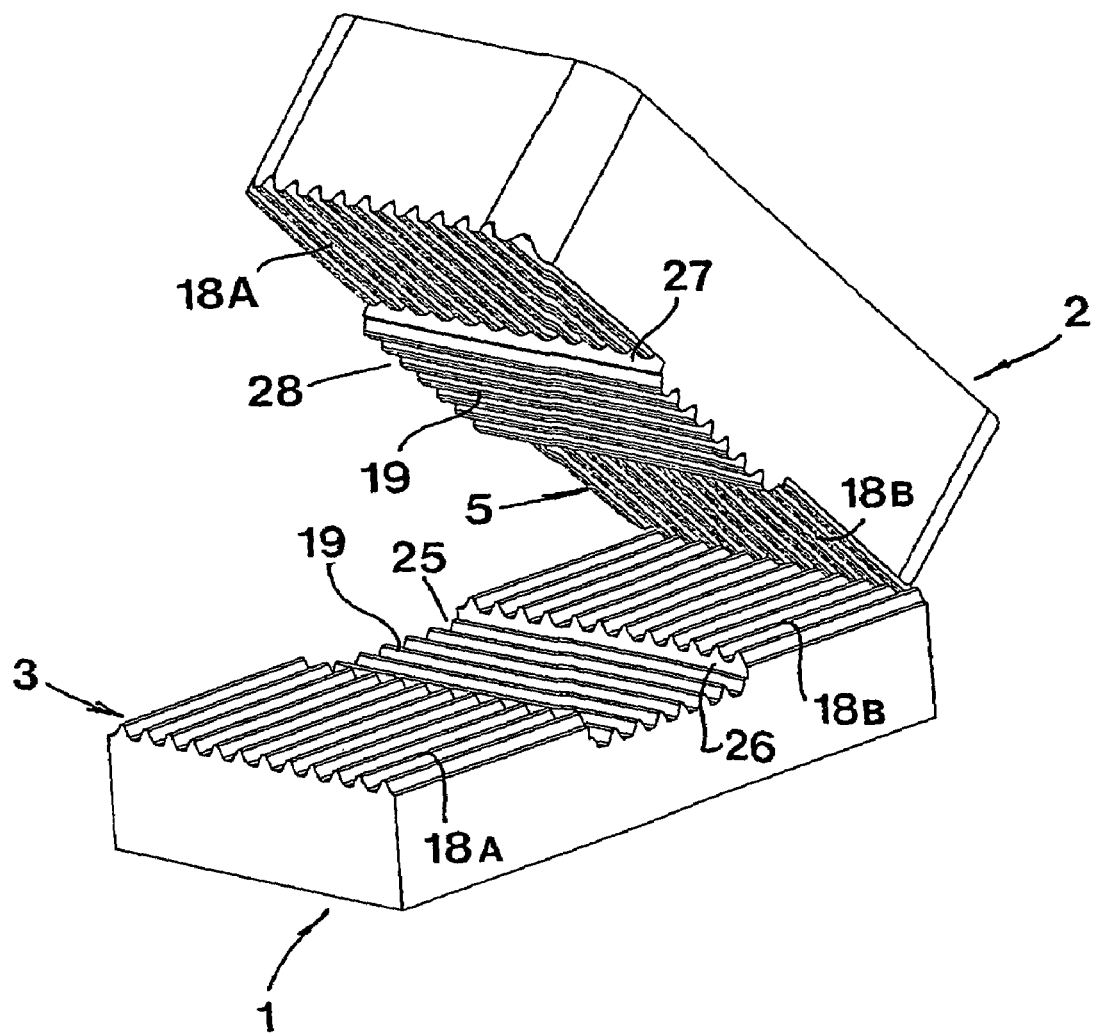
Figure 6:
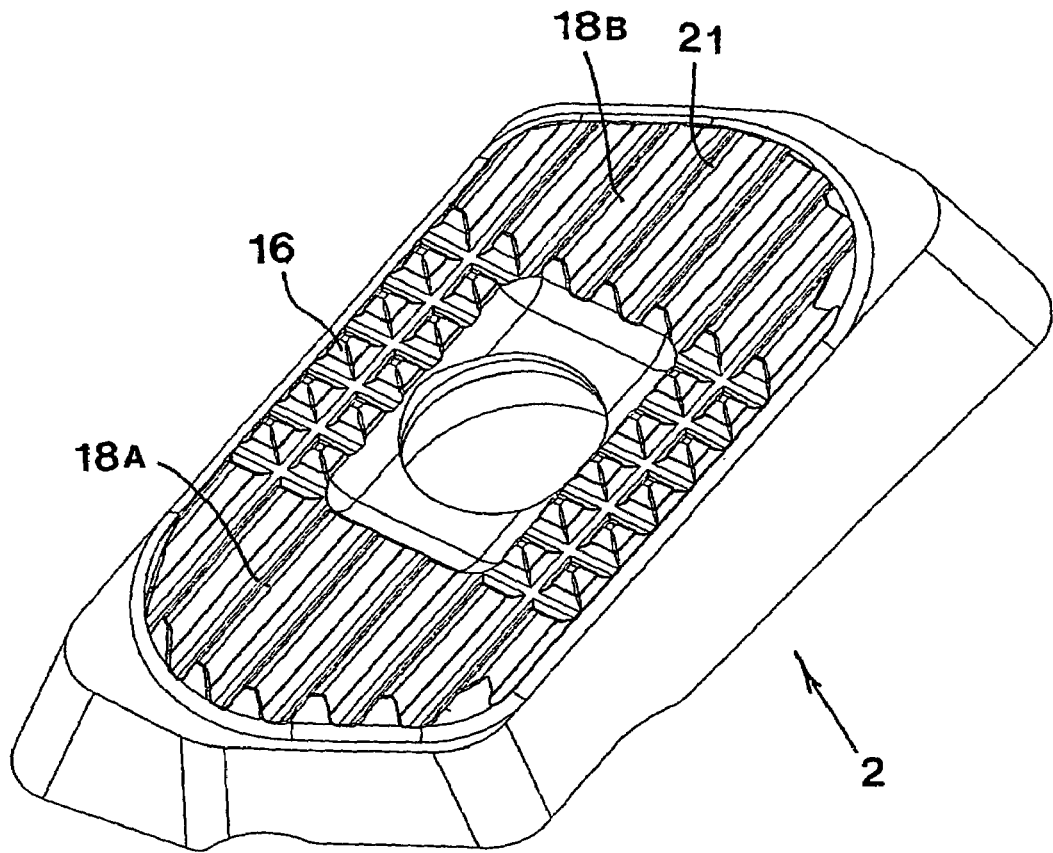

In the drawings:

FIG. 1 is a simplified perspective view showing a cutting tool, the basic body of which consists of a cutter head having an insert seat, in which a cutting insert is fixed, FIG. 2 is an end view showing the interface between the cutting insert and the insert seat on an enlarged scale, FIG. 3 is an enlarged, perspective exploded view showing the insert seat as well as the bottom side of the cutting insert, FIG. 4 is a schematic perspective view of an insert seat according to the invention, FIG. 5 is a perspective exploded view showing an alternative embodiment of a serration connection between a cutting insert and an insert seat, and FIG. 6 is a perspective view from below of a cutting insert according to the invention.

DETAILED DESCRIPTION OF PREFERRED EMBODIMENTS OF THE INVENTION

In FIG. 1, a rotatable cutting tool is shown exemplified as a milling cutter, which comprises a basic body 1, in the form of a cutter head, as well as a number of cutting inserts 2. For the sake of simplicity, only one such cutting insert is shown, although milling cutters in practice are provided with a plurality of peripherical and tangentially spaced cutting inserts. The individual cutting insert 2 is mounted in an insert seat designated 3, which is formed adjacent to a chip pocket 4 in the periphery of the basic body 1. The insert seat 3 consists of a first connecting surface of serration type, which is arranged to co-operate with a second serration connecting surface 5 (see FIGS. 2 and 3), which is formed on the bottom side of the cutting insert 2. The cutting insert 2 is fixed in the insert seat 3 by means of a suitable clamping member, which in the example consists of a screw 6, but which also may consist of a clamp or the like.

Before the two serration connecting surfaces 3, 5 are described closer, the general shape of the basic body 1 as well as of the cutting insert 2 should be briefly described. In the chosen example, the cutting insert 2 (see FIGS. 2 and 3) has a flat and quadrangular (square) basic shape, which is defined by generally planar and mutually parallel top and bottom sides 7, 8. Between these, four side surfaces 9 extend, which are similar and form clearance surfaces adjacent to cutting edges 10, 11, which are formed between the top side 7 and the side surfaces 9.

The cutter head 1 serving as basic body (see FIG. 1) has a ring-shaped front surface 12 and a rotationally symmetric envelope surface 13. Rearward from the main portion of the cutter head, a tapering portion 14 extends for the attachment in a tool holder. In FIG. 1, 15 designates the corner of the cutting insert, which is indexed forward to an active position. In this state, the edge 10 forms a major cutting edge and the edge 11 a minor cutting edge or wiper edge. It is axiomatic that the corner 15 indexed forward is exposed to the major part of the forces acting on the cutting insert during operation, while the other three corners, which are inactive, are not exposed to any substantial stresses.

Each one of the connecting surfaces 3 and 5 comprises in a conventional way a number of ridges and/or tops, which are mutually spaced apart by grooves. In the same way as in WO 9900208 A1, the connecting surface 5 of the exemplified cutting insert 2 is waffle-patterned or chequered, so far that the same comprises pyramidal tops 16 arranged in rows, which are uniform and spaced apart by grooves 17, 17', which extend perpendicularly to each other. The serration connecting surface 3 serving as insert seat comprises two different kinds of ridges generally designated 18 and 19, respectively, which extend perpendicularly to each other in order to guarantee mechanical locking of the cutting insert in two directions perpendicular to each other. The grooves positioned between the ridges 18 are designated 22. The cross-section shape of the ridges is conventional so far that the individual ridge is delimited by two opposed flank surfaces or flanks 20 (see FIG. 2), between which there is a crest 21, which forms the highest located portion of the ridge. Nearby ridges are laterally spaced apart by grooves 22, the bottoms of which are designated 23. A common angle between the flank surfaces 20 is 60°, although also other angles are feasible. It is essential that the crests of the ridges in one of the connecting surfaces do not bottom in the grooves in the other connecting surface. It is also essential that the pitch between the ridges is the same in the two connecting surfaces, because otherwise one of the connecting surfaces would not be able to be fit into the other.

As far as the shown serration connection between the cutting insert and the insert seat has been described hitherto, the same is in all essentials previously known by WO 9900208 A1.

New and characteristic of the present invention is that at least the connecting surface 3, which forms an insert seat in the basic body, comprises, on one hand, two spaced-apart sets of a plurality of mutually parallel, first ridges 18, which are arranged in extension of each other, and on the other hand one or more second, transverse ridges 19, which are located between the two sets of first ridges. In FIG. 4, a surface field, which comprises a first set of first ridges 18, is designated A, while a surface field spaced apart from the same and comprising a second set of first ridges 18 is designated B. As a consequence of this, the ridges in the first-mentioned field are designated 18A, while homologous ridges in the surface field B are designated 18B. Furthermore, in FIG. 4, 15A designates the corner in the insert seat, toward which the active corner 15 of the cutting insert 2 is turned in fixed position.

Reference being made to FIG. 1, it should be pointed out that the cutting insert 2 during operation is exposed to forces in three different directions in a conceived system of coordinates, namely tangential forces in the x direction, radial forces in the y direction and axial forces in the z direction. Of said forces, the radial forces in the y direction are considerably larger than the axial forces in the z direction.

Now reference is made again to FIG. 4, which illustrates how the number of ridges 18A, 18B in the surface fields A, B is considerably larger than the number of transverse ridges or intermediate ridges 19. Thus, in the example, the number of ridges 18A and 18B, respectively, amounts to twelve, while the number of transverse ridges 19 amounts to two. This means that the main part of the cutting forces acting on the cutting insert, namely the radial forces y, are carried by a large number of ridges via the force-transferring flanks thereof, the total area of which is many times larger than the total area of the flanks of the transverse ridges 19, which have the purpose of carrying the axial forces in the z direction. In this connection, it should be pointed out that surface contact for the transfer of force in the y direction essentially is established between, on one hand, the radially outwardly turned flank on each ridge 18A, 18B, and on the other hand the radially inwardly turned flank on each top 16 in the connecting surface 5 of the cutting insert. Surface contact for the transfer of force in the z direction, in turn, is established between, on one hand, the flank on each transverse ridge 19 that is facing the front surface 12 of the basic body, and on the other hand the flanks on the tops 16 of the waffle pattern that are turned away from said front surface. By the fact that the ridges 18 that should carry the dominant radial forces y are present not only adjacent to the corner 15A (in the surface field A), but also in the surface field B distanced from the corner in question, the capability of the connecting surface to resist the forces that aim to turn the cutting insert in relation to the insert seat, more precisely around a centre of rotation at the corner 15A, is radically improved.

Manufacture of the Tool

Of the two parts 1, 2, which together form the cutting tool, the basic body 1 is made from steel or the like, the serration connecting surface 3 being produced by precision machining, in particular milling, of the ridges and grooves that together form the surface in question. However, the individual cutting insert 2 is made by compression moulding and sintering of cemented carbide (or another material having considerably larger hardness and resistance to wear than steel), the connecting surface 5 on the bottom side of the cutting insert obtaining at least the basic shape thereof in connection with the pressing and sintering. In practice, the cutting insert may either be of the directly pressed type, i.e., lack after-treatment, or be ground in order to attain high precision.

Milling of the serration connecting surface 3 shown in FIG. 4 in the basic body may be carried out in various ways. One way is to initially produce the ridges 18A and 18B in two consecutive steps, between which an intermediate step is performed in which a milling cutter suitable for the purpose is raised in order to leave a central area on the cutting insert. For instance, the ridges 18A in the surface field A may first be formed by the milling cutter being brought in a horizontal plane. When the ridges have received the full length, the milling cutter is raised and jumps over or skips the central area, after which it once again is lowered down into the same plane as the first-mentioned one, in order to complete ridges 18B with the desired length. In another operation, another milling cutter, the shape of which is suitable for the provision of the transverse ridges 19, is brought along the bottom side of the cutting insert, more precisely perpendicularly to the feeding direction of the first milling cutter. In doing so, the two ridges 19 are produced, which extend between opposed side surfaces of the cutting insert. Between each individual transverse ridge 19 and a nearby set of longitudinal ridges 18A, 18B, secondary transverse ridges 19A and 19B, respectively, are also present. These ridges do not have full cross-section along the entire length thereof, but are intersected by more or less deep part slots 24, which constitute extensions of the grooves 22, and are produced in connection with raising and lowering, respectively, of the first milling cutter, which creates the ridges 18A, 18B. By the existence of these countersinks 24, the male-like formations 19A, 19B obtains at least partly the character of pyramid-like tops, rather than continuous ridges.

It is of course also feasible to form the sets of ridges in the opposite order, i.e., first the transverse ridges 19 and then the longitudinal ridges 18.

In the embodiment shown in FIG. 4, all ridges are equally high. More precisely, the crests 21 on all ridges 18A, 18B, 19, 19A and 19B are located in a common plane (that is parallel to the top side 7 of the cutting insert). However, it is also feasible to locate the ridges, or at least the crests thereof, in different planes. One such embodiment is exemplified in FIG. 5, in which a number of transverse ridges 19 in the connecting surface 3 serving as insert seat are located in another plane than the ridges 18A, 18B. More precisely, the transverse ridges 19 are countersunk in relation to the longitudinal ridges 18A, 18B. It should be made clear that the level difference between the respective ridges primarily consists of the crests of the ridges being located in different planes. This may be the case even if the ridges in the respective surface fields have different depth or height. The embodiment shown in FIG. 5 is particularly advantageous, so far that the crests of the ridges 19 are located in flush with or under the bottoms of the grooves 22, which are present between the ridges 18A, 18B. In such a way, the manufacture can be carried out without any jumping motions of the milling cutter. Thus, in a first operation, it is possible to bring the milling cutter in one plane from one end of the insert seat to the opposite, after which a second milling cutter is brought to move perpendicularly to, and on a lower level than the first milling cutter, so as to form the transverse ridges 19. In doing so, in the basic body, a central countersink 25 is formed, which along opposed edges is delimited by shoulder surfaces 26. If desired, said shoulder surfaces 26 may be utilized for purposes of transfer of force by being formed with close fit in relation to two edge surfaces 27 on a female portion 28 protruding from the bottom side of the cutting insert, which female portion carries transverse ridges 19 and has the same basic shape as the countersink 25.

In the example according to FIG. 5, the cutting insert 2 is indexable in only two positions. For this reason, instead of a waffle-patterned serration connecting surface, a connecting surface 5 may be used that, like the insert seat3, comprises two mutually spaced-apart sets of longitudinal ridges 18A, 18B, as well as transverse ridges 19 between the same, the transverse ridges 19 being formed on the female portion 28.

Finally, in FIG. 6, an alternative embodiment of a cutting insert 2 is shown, which on the bottom side thereof has two spaced-apart sets of longitudinal ridges 18A, 18B, as well as one set of pyramidal tops 16, which are arranged in a plurality of (five) transverse rows for the co-operation with complementary transverse ridges 19 in an insert seat3.

The number of longitudinal and transverse ridges, respectively, in the sets of ridges, which together form a serration connecting surface, may vary most considerably. However, generally, the number of longitudinal ridges should be considerably larger than the number of transverse ridges. In practice, the number of longitudinal ridges may, accordingly, be at least 10, or even 20 times larger than the number of transverse ridges. This is for the total area of the active flanks of the longitudinal ridges (one on each individual ridge) to become many times larger than the total area of the force-carrying flanks of the transverse ridge or ridges. The number of transverse ridges may advantageously be as small as 1, although also variants of 2-6 transverse ridges are feasible, as has been exemplified in the drawings. The absolute number of longitudinal ridges in each one of the two surface fields A, B may advantageously amount to 10 or more.

LIST OF REFERENCE DESIGNATIONS

1=basic body
2=cutting insert
3=serration connecting surface (insert seat)
4=chip pocket
5=serration connecting surface (on cutting insert)
6=screw
7=top side of cutting insert
8=bottom side of cutting insert
9=side surfaces
10=major cutting edge
11=wiper edge
12=front surface
13=envelope surface
14=fixing portion
15=active corner on cutting insert
15A=corner in insert seat
16=serration tops
17=grooves
18=longitudinal ridges
19=transverse ridges
20=flanks of ridge
21=crest of ridge
22=grooves
23=bottom of groove
24=slots of groove
25=countersink in insert seat
26=shoulder surfaces
27=edge surfaces
28=female portion

The invention claimed is:

1. A basic body of a cutting tool comprising a connecting surface of serration type serving as insert seat,
    wherein the connecting surface includes three surface fields each containing ridges delimited by intermediate grooves, the first surface field contains a plurality of parallel first ridges, the second surface field contains one or more second ridges that are transverse to the first ridges, and the third surface field contains a plurality of parallel first ridges that are aligned in extension of the first ridges in the first surface field,
    wherein the second surface field is positioned between the first surface field and third surface field, and
    wherein each first ridge in the first and third surface fields includes a crest that is uninterrupted from an edge of the insert seat to the second surface field.

2. The basic body according to claim 1, wherein at least crests of the first and second ridges are located in a common plane.

3. The basic body according to claim 2, wherein between an individual transverse ridge and a nearby set of first ridges, a third type of serrations are formed in the form of a plurality of tops, which are located in a row parallel to the transverse ridge, and are mutually spaced apart by extensions of the grooves that separate said first ridges laterally.

4. The basic body according to claim 1, wherein at least the crest of the transverse ridge or ridges are situated in another plane than the crests of the first ridges.

5. The basic body according to claim 4, wherein the transverse ridge or ridges are countersunk in relation to the first ridges.

6. The basic body according to claim 5, wherein the transverse ridge or ridges are countersunk to a level on which their crests are in or below an imaginary plane in which the bottoms of the grooves positioned between the first ridges are located.

7. The basic body according to claim 1, wherein the number of first ridges is considerably larger than the number of transverse ridges.

8. The basic body according to claim 7, wherein the number of first ridges is between 10 and 20 times larger than the number of transverse ridges.

9. The basic body according to claim 8, wherein the number of transverse ridges is between 1 and 6.

10. The cutting tool according to claim 8, wherein the number of first ridges is considerably larger than the number of transverse ridges.

11. The cutting tool according to claim 10, wherein the number of first ridges is between 10 and 20 times larger than the number of transverse ridges.

12. The basic body according to claim 1, wherein crests of the second, transverse ridges in the second surface field are uninterrupted from one edge of the insert seat to an opposing edge of the insert seat.

13. The basic body according to claim 1, wherein the intermediate grooves in the first and third surface fields continue at least partially into the second surface field, so that at least some crests of the transverse ridges are interrupted.

14. The basic body according to claim 1, wherein the connecting surface of the insert seat consists essentially of the first, second, and third surface fields.

15. A cutting tool comprising:
   a basic body including an insert seat, and
   a cutting insert, which is detachably connected and rigidly secured in the insert seat by means of connecting surfaces of serration type,
   wherein at least the connecting surface that forms the insert seat includes three surface fields each containing ridges delimited by intermediate grooves, the first surface field contains a plurality of parallel first ridges, the second surface field contains one or more second ridges that are transverse to the first ridges, and the third surface field contains a plurality of parallel first ridges that are aligned in extension of the first ridges in the first surface field,
   wherein the second surface field is positioned between the first surface field and third surface field, and
   wherein each first ridge in the first and third surface fields includes a crest that is uninterrupted from an edge of the insert seat to the second surface field.

16. The cutting tool according to claim 15, wherein the cutting tool includes a clamping member operatively positioned wholly in the second surface field.

17. The cutting tool according to claim 15, wherein between an individual transverse ridge and a nearby set of first ridges, a third type of serrations are formed in the form of a plurality of tops, which are located in a row parallel to the transverse ridge, and are mutually spaced apart by extensions of the grooves that separate said first ridges laterally.

18. The cutting tool according to claim 15, wherein at least the crest of the transverse ridge or ridges are situated in another plane than the crests of the first ridges.

19. A cutting insert of a cutting tool, comprising a connecting surface of serration type,
   wherein the connecting surface includes three surface fields each containing ridges delimited by intermediate grooves, the first surface field contains a plurality of parallel first ridges, the second surface field contains one or more second ridges that are transverse to the first ridges, and the third surface field contains a plurality of parallel first ridges that are aligned in extension of the first ridges in the first surface field,
   wherein the second surface field is positioned between the first surface field and third surface field, and
   wherein each first ridge in the first and third surface fields includes a crest that is uninterrupted from an edge of the connecting surface of the cutting insert to the second surface field.

20. The cutting insert according to claim 19, wherein the cutting insert includes an opening or a recess for a clamping member that is positioned wholly in the second surface field.

21. The cutting insert according to claim 19, wherein the number of first ridges is considerably larger than the number of transverse ridges.

22. The cutting insert according to claim 21, wherein the number of first ridges is between 10 and 20 times larger than the number of transverse ridges.

23. The cutting insert according to claim 19, wherein between an individual transverse ridge and a nearby set of first ridges, a third type of serrations are formed in the form of a plurality of tops, which are located in a row parallel to the transverse ridge, and are mutually spaced apart by extensions of the grooves that separate said first ridges laterally.

24. The cutting insert according to claim 19, wherein at least the crest of the transverse ridge or ridges are situated in another plane than the crests of the first ridges.

* * * * *